United States Patent [19]

Acker

[11] Patent Number: 4,662,569
[45] Date of Patent: May 5, 1987

[54] BULK DEMOLITION RECYCLING SYSTEM

[76] Inventor: Peter B. Acker, 1200 Forrest St., Marshfield, Mass. 02050

[21] Appl. No.: 799,254

[22] Filed: Nov. 18, 1985

[51] Int. Cl.⁴ ............................................. B02C 23/38
[52] U.S. Cl. ....................................... 241/62; 241/77; 241/81; 241/DIG. 38
[58] Field of Search ........................ 241/20, 24, 75, 76, 241/77, 78, 81, 101 B, DIG. 38, 62

[56] References Cited

U.S. PATENT DOCUMENTS 3,817,459  6/1974  Keller .
4,044,956  8/1977  Bennedetto .
4,458,846  7/1984  Mardigian ........................ 241/24 X

OTHER PUBLICATIONS

Battery Case and Top Reclamation/Classification System, M. A. Engineering.

Primary Examiner—Mark Rosenbaum

[57] ABSTRACT

This invention relates generally to bulk demolition recycling systems and the like and more specifically to a bulk demolition recycling system which utilizes tanks of agitated and the control direction flow of water in combination with mesh baskets to provide the necessary separations.

7 Claims, 11 Drawing Figures

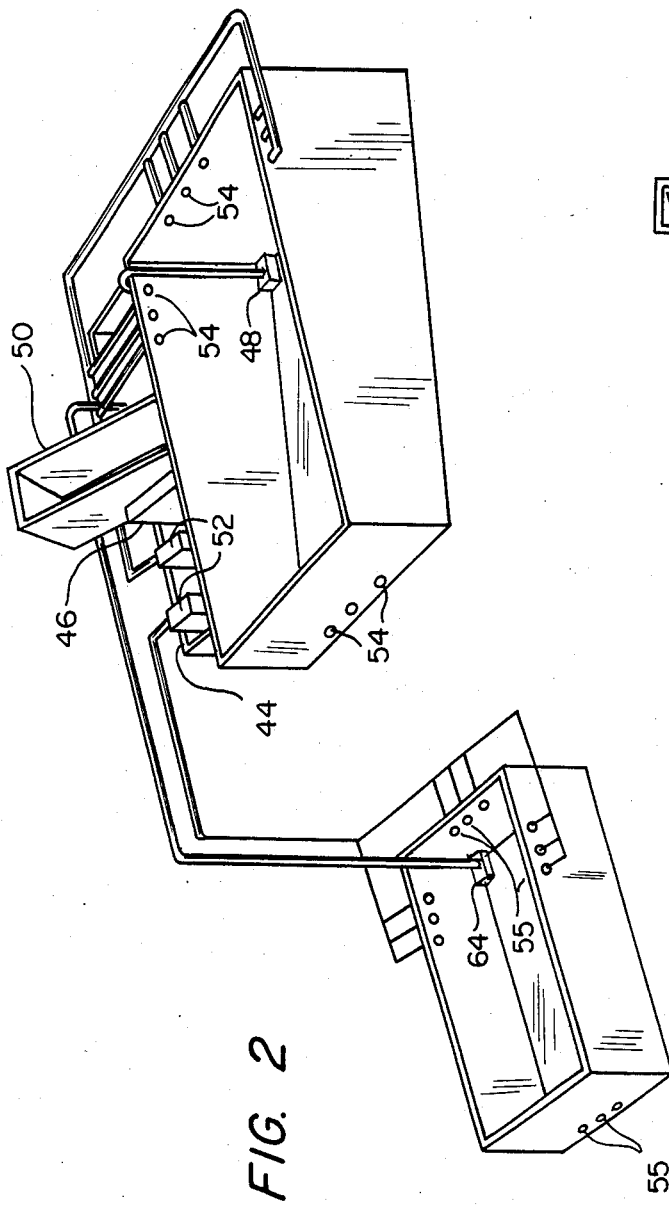
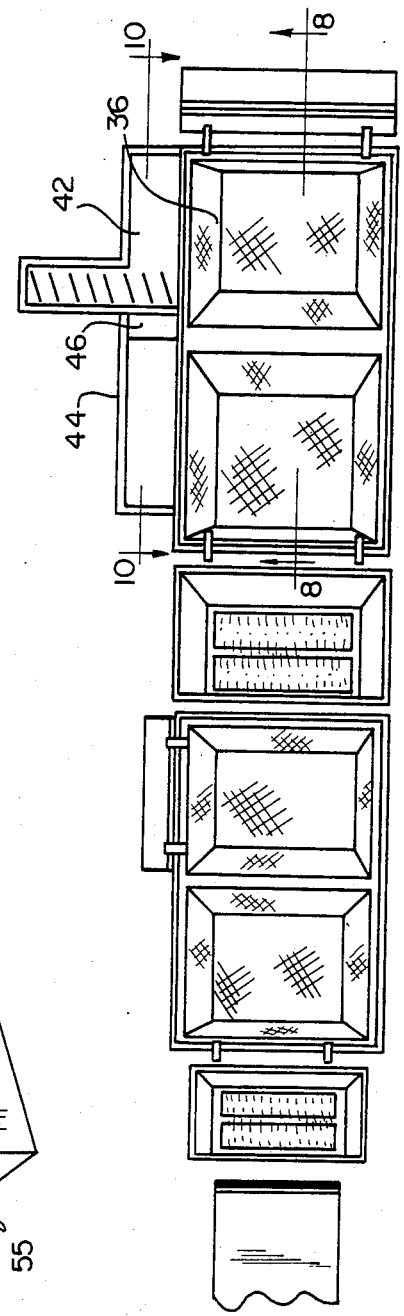
FIG. 2
FIG. 3

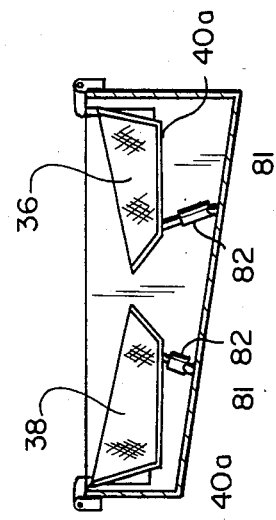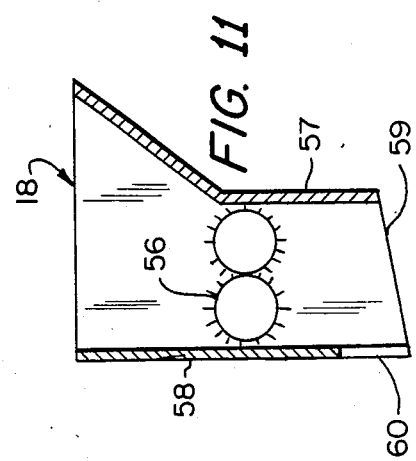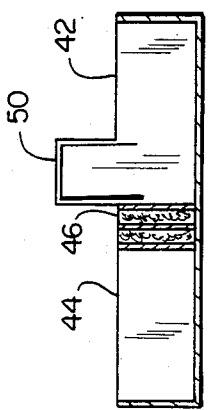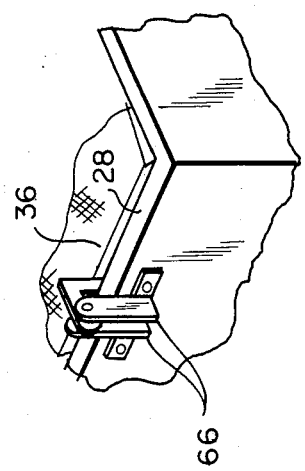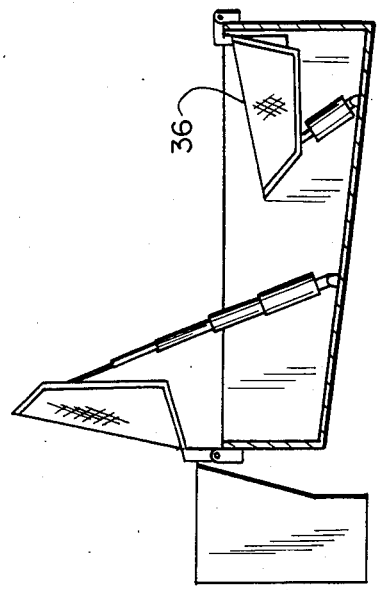

BULK DEMOLITION RECYCLING SYSTEM

BACKGROUND OF THE INVENTION

This invention relates generally to bulk demolition recycling systems and the like and more specifically to a bulk demolition recycling system which utilizes tanks of agitated and flowing water in combination with mesh baskets to provide the necessary separations.

SUMMARY OF THE INVENTION

This invention is directed at a bulk demolition recycling system comprising a main tank having fluid contained therein for receiving bulk demolition material and the like, the main tank having a floor portion, the fluid in the main tank being agitated and flowing in a predetermined direction, a first receiving means mounted in the main tank, a second receiving means mounted in the main tank adjacent the first receiving means downstream therefrom, a second tank positioned in close proximity to the main tank, the second tank having fluid contained therein, a first housing positioned proximate the main tank and having a first demolition means mounted therein, the first demolition means having first material transportation means associated therewith for passing material from the first demolition means to a third tank, the third tank containing fluid, the fluid in the third tank being agitated and flowing in a predetermined direction, a third receiving means mounted in the third tank, a fourth receiving means mounted in the third tank adjacent the third receiving means downstream therefrom, a second housing positioned proximate the third tank and having a second demolition means mounted therein, the second demolition means having second material transportation means associated therewith for passing material from the third tank to a predetermined destination, the first receiving means adapted to move material from the main tank to a position exterior of the main tank, the second receiving means adapted to move material from the main tank to the first demolition means, first pump means associated with the main tank for removing material from the main tank to the second tank, the third receiving means adapted to move material from the third tank to a position exterior of the third tank, the fourth receiving means adapted to move material from the third tank to the second demolition means, second pump means associated with the third tank for removing material from the third tank to the second tank.

BRIEF DESCRIPTION OF THE DRAWINGS

Further details are explained below with the help of the examples illustrated in the attached drawings in which:

FIG. 2 is an perspective view of the bulk demolition recycling system shown in FIG. 1 with the piping to some of the jets left off;

FIG. 3 is a top plan view of the bulk demolition recycling system shown in FIG. 1;

FIG. 7 is an perspective view, of the connection between a receiving basket and a tank, of the bulk demolition recycling system shown in FIG. 1;

FIG. 8 is a side elevational view of first tank of the bulk demolition recycling system shown in FIG. 1;

FIG. 9 is a side elevational view of third tank and the first hopper of the bulk demolition recycling system shown in FIG. 1;

FIG. 10 is an enlarged top plan view of the second tank of the bulk demolition recycling system shown in FIG. 1; and FIG. 11 is an sectional view of the first hopper of the bulk demolition recycling system shown in FIG. 1;

DESCRIPTION OF THE PREFERRED EMBODIMENT(S)

Figure 1:
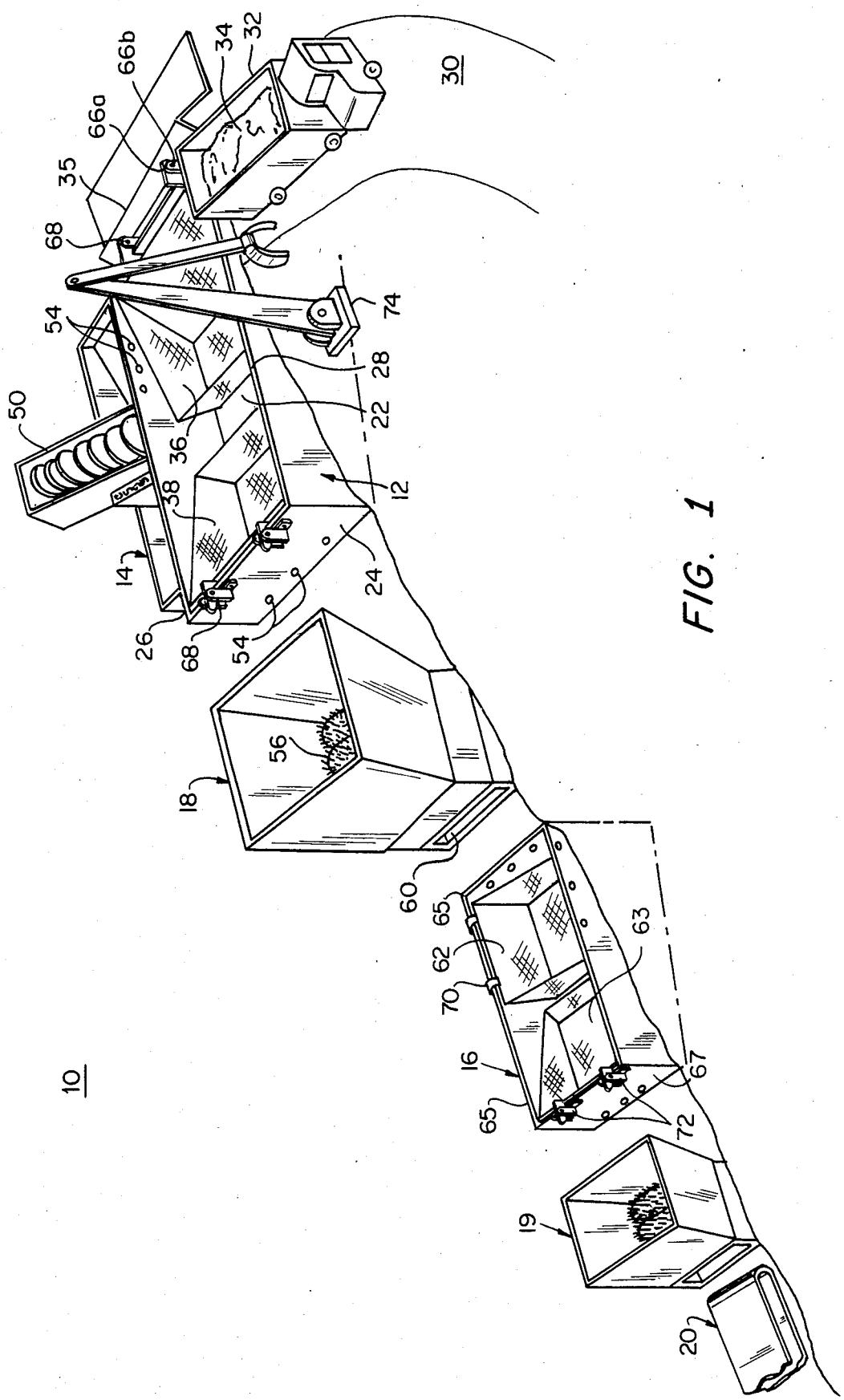
FIG. 1 is a exploded view of the bulk demolition recycling system according to the present invention.
Figure 4:
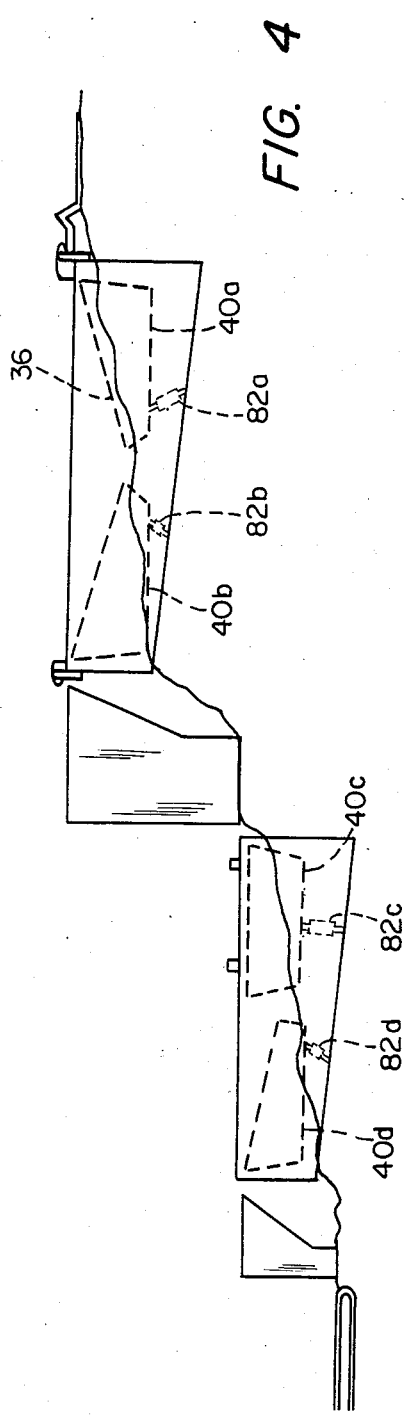
FIG. 4 is an side elevational view, of the bulk demolition recycling system shown in FIG. 1.
Figure 6:
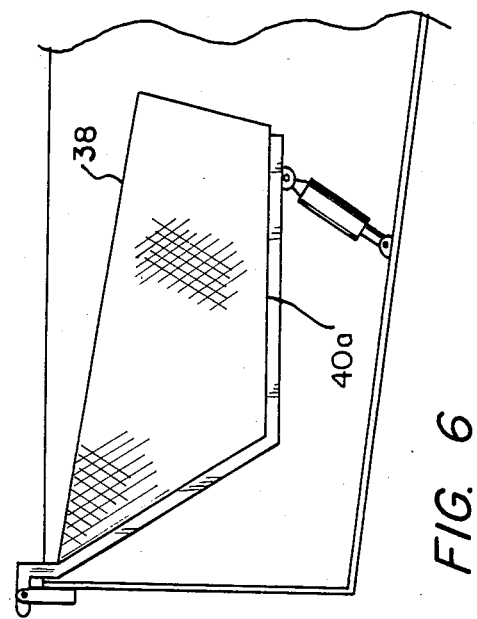
FIG. 6 is a sectional view of a receiving basket of the bulk demolition recycling system shown in FIG. 1.
Figure 5:
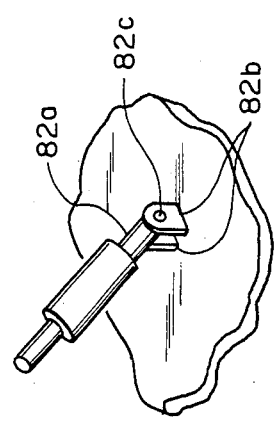
FIG. 5 is an perspective view of an hydraulic ram, of the bulk demolition recycling system shown in FIG. 1.

There is shown in the drawings at FIG. 1 a bulk demolition recycling system 10 including a main tank 12, a second tank 14, a third tank 16, a first hopper 18, second hopper 19 and a conveyor 20. The main tank 12 is generally rectangular in configuration, is formed of a structural concrete, is open at the top providing a first chamber 22 and having an end wall 24. The main tank 12 includes a long common wall 26. The upper edge 28 of the main tank 12 defines the top opening. The upper edge 28 is positioned at ground level 1. A ramp 30 extends over ground level 1, external of the system 10, to slightly below the upper edge 28 of the main tank 12. The ramp 30 provides a means for a dump truck 32 to back its load 34 to the upper edge 28 and to then dump the load 34 into the main tank 12. An inclined plane 35 extends from the upper edge 28 of the short side of the main tank 12 remote from the end wall 24. A first receiving basket 36 is mounted in the main tank 12 and a second receiving basket 38 is mounted adjacent the first receiving basket 36 in the main tank 12. The first receiving basket 36 and the second receiving basket 38 are each formed of a mesh defining sides and a base portion 40a, 40b respectively. Both baskets 36, 38 are open at the top.

The second tank 14 is generally rectangular in configuration, is formed of a structural concrete, is open at the top and is divided into a second chamber 42 and a third chamber 44 separated by a transversely positioned stone filter 46. A first dredge pump 48 is adapted to pump the sand, silt and other material from the sump of the main tank 12, resulting from the separation process which will be explained hereinafter, into the second tank 14. Note that the upper edges of the remaining sides of the second tank 14 are spaced below the upper edges 28 of the main tank 12. A sand screw 50 is mounted in the sump of the second tank 14 and communicates with an area external to the second tank 14. One or more water pumps 52 are mounted on the floor of the third chamber 44 which distributes the water, resulting from the separation process which will be explained hereinafter, to jet ports 54 formed in the four walls of the main tank 12 and to jet ports 55 formed in the third tank 16. A ripping machine 56 is mounted below the first hopper 18 for ripping and shredding material resulting from the separation process which will be explained hereinafter. The assembly of the first hopper 18 and the ripping machine 56 is slightly spaced from the end wall 24, includes a first side wall 57, a second side wall 58 and a floor 59. The floor 59 of the first hopper 18 is positioned as an inclined plane from a high point on the first side wall 57 to a low point at the lower portion of the second side wall 58 which is positioned in close proximately to the chamber of the third tank 16. The lower portion of the second side wall 58 includes a through door 60 which pass the shredded material from the first hopper 18 into the third tank 16.

The third tank 16 is generally rectangular in configuration, is formed of a structural concrete, is open at the top and includes a long wall 65 and a second short wall 67. A third receiving basket 62 and a fourth receiving basket 63 are positioned in the third tank 16. The fourth receiving basket 63 is positioned in the third tank 16 in a manner similar to that of the positioning of the second receiving basket 38 in the main tank 12. The third receiving basket 62 and the fourth receiving basket 63 are constructed in a manner similar in all respects to the first receiving basket 36. A second hydojet pump 64 is adapted to pump the sand, silt and other material from the sump of the third tank 16, resulting from the separation process which will be explained hereinafter, into the second tank 14. The second hopper 19 which is in spaced proximate relation to the third tank 16 has a chipper positioned therein, which further cuts the material in preparation for use in the fabrication of pressed wood and the like. The chipped material is then deposited on a conveyor 20.

A first pair of arms 66 are mounted on the upper edge 28 of the short side of the main tank 12 remote from the end wall 24 extending to attach to the top of the first receiving basket 36. A second pair of arms 68 are mounted on the upper edge 28 of the main tank 12 at the end wall 24 extending to attach to the top of the second receiving basket 38. A third pair of arms 70 are mounted on the upper edge of the long wall 65 of the third tank 16 proximate the first hopper 18 extending to attach to the top of the third receiving basket 62. A fourth pair of arms 72 are mounted on the upper edge of the second short wall 67 of the third tank 16 extending to attach to the top of the fourth receiving basket 63. The purpose of the arms will be set forth hereinafter. One end of a hydraulic ram 82 is pivotally mounted on the outer surface of the base portions 40a, 40b, 40c, 40d of the first receiving basket 36, second receiving basket 38, third receiving basket 62 and the fourth receiving basket 63 respectively and the other end of the hydraulic ram 82 is pivotally mounted to the floor of the tank within which the receiving basket from which it extends is positioned. The method of mounting the hydraulic ram 82 is to the floor of the tank within which the receiving basket is positioned includes a tongue attached to and extending from the end of each of the hydraulic rams 82. The tongue has a through aperture formed therein proximate the free end of the tongue. A pair of spaced projections are attached to and extend upwardly from the floor of the tanks. Each of the projections has a through hole formed therein which are in horizontal alignment and the tongue is positioned between the projections with its aperture aligned with the holes in the projections. A pin is then passed through the holes and apertures permitting the tongue to partially rotate about the pin. The other end of the hydraulic ram 82 is mounted on its respective receiving basket 38 in the same manner as that disclosed for its attachment with the floor of the tank. Each of the arms 66, 68, 70, and 72 are mounted on the top of their attached wall in a similar manner utilizing a tongue and projections.

A mechanism for lifting heavy objects such as a crane or cherry picker 74 is mounted outside the main tank 12 so that its lifting apparatus may operate within the main tank 12.

The bulk demolition recycling system operates with the first chamber 22 of the main tank 12, the second tank 14 and the third tank 16 filled with water. Due to the action of the water rushing from the jet ports 54 the water in the main tank 12 is extremely turbulent having a flow toward the end wall 24 then toward the floor of the first chamber 22 thence back to the other end wall of the main tank 12 and tends to push flotation material in the direction of the end wall 24. The first receiving basket 36 and the second receiving basket 38 are immersed in the water of the main tank 12 so that there is a depth of water above them. The load 34 from the dump truck 32 is deposited in the turbulent water of the main tank 12 over the first receiving basket 36. Extremely large items such as logs, for example, are spotted by the operator of the crane 74 and are picked out of the main tank 12. Sand, silt and other fine nonfloating materials will descend to the floor of the main tank 12, through the gratings of the first receiving basket 36 and the second receiving basket 38 where the hydrojet pump 48 will pump it into the water of the second chamber 42 of the second tank 14. Nonfloat material will descend through the turbulent water and be deposited on the base portion 40a of the first receiving basket 36. Float material will be pushed by the turbulent water toward the end wall 24 over the second receiving basket 38. The hydraulic ram 82 under the first receiving basket 36 is actuated by an operator thereby lifting the first receiving basket 36 with its contents, rotating it about the pivot points of the first arms 66 and dumping the contents on the inclined plane 35 where it slides onto a platform 76. A crew working at the platform 76 separates the different materials, bricks, concrete slabs etc. for later reuse. Materials that can not be reused in their present form are sent to a crusher to be reduced to a size acceptable for land fill use. The hydraulic ram 82 under the second receiving basket 38 is actuated by an operator thereby lifting the second receiving basket 38 picking up the float material, rotating it about the pivot points of the second arms 68 and dumping it into the first hopper 18. The float material comprises wood pieces with nails, screws, hardware and the like and other buoyant articles. The ripping machine 56 further shreds the float material which is dropped onto the inclined floor 59 and slides through the rectangular opening 60 provided in the second side wall 58 into the turbulent water of the third tank 16. Due to the action of the water rushing from a second set of jet ports 55 formed in the walls of the third tank 16 the flotation material is urged in the direction of the third short wall 67 of the third tank 16 which is proximate the hopper 18. The water flow in the third tank 16 is similar to that of the first chamber 22 of the main tank 12. The third receiving basket 62 and the fourth receiving basket 63 are immersed in the water of the third tank 16 so that there is a depth of water above them. The load from the ripping machine 56 is deposited in the turbulent water of the third tank 16 over the third receiving basket 62. Sand, silt and other fine nonfloating materials will descend to the floor of the third tank 16, through the gratings of the third receiving basket 62 and the fourth receiving basket 63 where the hydrojet pump 48 will pump it into the water of the fourth chamber 42 of the second tank 14. Nonfloat material will descend through the turbulent water and be deposited on the base portion 40c of the third receiving basket 62. Float material will be pushed by the turbulent water toward the third short wall 67 over the fourth receiving basket 63. The hydraulic ram 82 under the third receiving basket 62 is actuated by an operator lifting the third receiving basket 62 with its contents, rotating it about the pivot points of the third arms 70 and dumping the contents onto a second platform or table 78 outside the third tank 16. The hydraulic ram 82 is actuated by an operator lifting the fourth receiving basket 63 rotating it about the pivot points of the second arms 68 through the floating material thence dumping the floating material into the second hopper 19 which has a chipper mounted therein. The chipper chips up the material and deposits it on the conveyer 20.

The stones of the stone filter 46 separating the second chamber 42 and the third chamber 44 may be positioned in a rectangular, removable mesh cage so that the cage can be removed with the stones for cleaning. The water pump 52 mounted on the floor of the second chamber 44 pumps the filtered water from the second chamber 44 to the jet ports 54 of the main tank 12 and to the jet ports 55 formed in the third tank 16. In effect the water pump 52 "draws" the water from the second chamber 42 through the stone filter 46 into the third chamber 44.

At each of the stations where material is deposited outside the system, men remove the material for use elsewhere. This is also true of the material deposited on the conveyer 20.

What I claim is:

1. A bulk demolition recycling system comprising a main tank having fluid contained therein for receiving bulk demolition material, the main tank having a floor portion, the fluid in the main tank being agitated and flowing in a predetermined direction, a first receiving means mounted in the main tank, a second receiving means mounted in the main tank adjacent the first receiving means downstream therefrom, a second tank positioned in close proximity to the main tank, the second tank having fluid contained therein, a first housing positioned proximate the main tank and having a first demolition means mounted therein, the first demolition means having first material transportation means associated therewith for passing material from the first demolition means to a third tank, the third tank containing fluid, the fluid in the third tank being agitated and flowing in a predetermined direction, a third receiving means mounted in the third tank, a fourth receiving means mounted in the third tank adjacent the third receiving means downstream therefrom, a second housing positioned proximate the third tank and having a second demolition means mounted therein, the second demolition means having second material transportation means associated therewith for passing material from the third tank to a predetermined destination, the first receiving means adapted to move material from the main tank to a position exterior of the main tank, the second receiving means adapted to move material from the main tank to the first demolition means, first pump means associated with the main tank for removing material from the main tank to the second tank, the third receiving means adapted to move material from the third tank to a position exterior of the third tank, the fourth receiving means adapted to move material from the third tank to the second demolition means, second pump means associated with the third tank for removing material from the third tank to the second tank.

2. The combination as set forth in claim 1 wherein the second tank includes a filter means dividing the second tank into a first chamber and a second chamber and the first and second pump means empty into the first chamber of the second tank.

3. The combination as set forth in claim 2 wherein the filter means comprises a stone filter.

4. The combination as set forth in claim 3 wherein the second chamber of the second tank includes third pump means, the main tank includes walls and the third tank includes walls, the walls of the main tank and the third tank having jet ports, the third pump means connected to the jet ports formed in the main tank and the third tank and the flow from the jet ports of the main tank and the third tank functioning to agitate the water therein.

5. The combination as set forth in claim 1 wherein the first receiving means and the second receiving means are baskets.

6. The combination as set forth in claim 1 wherein the second tank includes a sand screw, the sand screw functioning to move silt from the second tank to a position exterior of the second tank.

7. The combination as set forth in claim 1 wherein the first demolition means comprises a shredding machine.

* * * * *